United States Patent [19]

Rosenthal

[11] 4,268,493
[45] May 19, 1981

[54] COMPOSITION AND METHOD FOR IMPROVING MEAT PRODUCTION AND QUALITY AS WELL AS FEED UTILIZATION BY ANIMALS

[76] Inventor: Walter Rosenthal, 150 E. 74th St., New York, N.Y. 10021

[21] Appl. No.: 956,853

[22] Filed: Nov. 2, 1978

[51] Int. Cl.³ .................. A61K 43/00; A23K 1/165
[52] U.S. Cl. ............................. 424/1; 424/9; 424/150; 426/2; 426/807
[58] Field of Search ............. 424/1, 9, 150; 426/2, 426/807

[56] References Cited

U.S. PATENT DOCUMENTS

| | | | |
|---|---|---|---|
| 3,674,770 | 7/1972 | Hoover et al. | 426/807 |
| 3,749,579 | 7/1973 | Andelfinger et al. | 424/150 |
| 4,140,766 | 2/1979 | Kalogris | 424/150 |

OTHER PUBLICATIONS

Lange et al., Handbook of Chemistry, 4th Ed., Handbook Publishers, Inc., Sandusky, Oh. 1941, pp. 206–207.

*Primary Examiner*—Benjamin R. Padgett
*Assistant Examiner*—Christine M. Nucker
*Attorney, Agent, or Firm*—Erich M. H. Radde

[57] ABSTRACT

Qualitative and quantitative meat production is improved considerably and decisively through administration of radio-active iodine isotope compounds, preferably the artificial iodine isotope $I^{131}$. The glandular thyroid tissue is destroyed to any desirable degree by its administration. This method has the great advantage that in general a single administration suffices to achieve dramatic results. The method does not interfere with other measures used to improve meat production, such as early castration, or the use of feed additives like vitamins, antibiotics, and hormone preparations.

4 Claims, No Drawings

COMPOSITION AND METHOD FOR IMPROVING MEAT PRODUCTION AND QUALITY AS WELL AS FEED UTILIZATION BY ANIMALS

BACKGROUND OF THE INVENTION

1. Field of the Invention

The present invention relates to a novel and highly effective composition and method for the treatment of animals and more particularly of farm animals for the purpose of qualitatively and quantitatively improving meat production due to a better and faster utilization of the feed, weight gain, and tenderizing effect on the meat.

2. Description of the Prior Art

In general use is a method of improving meat production as to quality and quantity which method consists in the early castration of the animals. In principle this method is based on reducing the male type characters of the meat. The same principle is made use of in the administration of female hormones, either alone or in combination with other sex hormones. Hormone feeding as well as administration of antibiotics for similar purposes are objectionable because residues remaining in the meat at slaughtering time are objectionable from the health point of view. The main drawback of these methods, however, is their rather limited efficacy.

SUMMARY OF THE INVENTION

It is one object of the present invention to provide a novel and highly effective composition for improving meat production and quality as well as feed utilization and weight gain in animals and especially in farm animals which composition is free of the disadvantages of the heretofore used compositions.

Another object of the present invention is to provide a method of administering such a composition to animals without surgical procedures in a simple and effective manner and in an economical way.

Other objects of the present invention and advantageous features thereof will become apparent as the description proceeds.

The present invention is based on the principle of imparting to ordinary, i.e. regular animals in a simple manner all the characteristics of high-breeds as far as quality, speed, and efficiency of meat production is concerned.

Thus the present invention consists in the administration of agents capable of reducing the function of the thyroid gland and thus producing changes in the endocrine system. It was found that reduced mobility, rapid weight gain, tenderness and superior taste qualities of the meat of high breed animals are mainly due to a much slower function of the thyroid gland as compared with its function in animals which have not undergone selective breeding and genetic improvement, such as the Longhorn cattle of the Americas, also called creole cattle in Latin America, the Zebu cattle in India, and others.

According to the present invention, the thyroid function of animals is decreased to the desired level by administration of radio-active iodine as it is used in human medicine for the treatment of hyperthyroidism.

The preferred radio-active iodine isotope is the iodine $I^{131}$ which has a half-life of only eight days. Therefore, 99% of its radiant energy is depleted within 56 days. Thus only less than 1/1000 of the administered amount of radioactive iodine is not depleted after three months, notwithstanding the fact that due to metabolism and excretion no trace of radioactivity can be detected in the animal body even after two months. Thus this isotope of iodine is especially suitable for the purpose of the present invention. The radio-active emissions of iodine $I^{131}$ are X-rays or $\gamma$-radiation and $\beta$-particles. These $\beta$-particles are, as is known, most destructive to the thyroid gland tissue but do not noticeably affect and damage the surrounding tissue. As a result of the antithyroidal effect of the radio-active iodine isotope $I^{131}$, the activity of the thyroid gland is partly reduced to any desired degree. Since the glandular members of the endocrine system have a proven interrelationship, changing of the activity of one gland affects all the other glands to a greater or lesser extent. Thus reducing or inhibiting the activity of the thyroid gland by administering radio-active iodine according to the present invention causes a considerable increase in weight, a better and faster utilization of the nutrients in the feed, and also an improvement in the meat quality.

As stated above the iodine $I^{131}$ isotope has proved to be especially suitable for the purpose of the present invention. This compound is preferably used in the form of sodium iodide $I^{131}$. The radio-active sodium iodide is preferably administered orally in the form of an aqueous solution. The doses to be administered can readily be determined for each type and species of animal. The dose varies between 20 millicuries and 2000 millicuries per steer of heifer. For other animals such as sheep, goats, hogs, rabbits, chicken and others, the dosage is correspondingly lower. In general, a dose between 0.02 millicuries to 0.2 millicuries per kilogram of body weight has proved to be effective. Usually administration of one single dose is required at a time when the animal has reached its final size.

The required dose is readily determined for each type and breed of animal by simple preliminary tests. Too large a dosage, especially at an early age, may lead to undesired side effects. As stated above, oral administration of aqueous solutions of the radio-active sodium iodide $I^{131}$ has proved to be the most preferred mode of administration.

BRIEF DESCRIPTION OF THE PREFERRED EMBODIMENTS

The following example serves to illustrate the present invention without, however, limiting the same thereto.

EXAMPLE

Composition containing radio-active iodine $I^{131}$. A sodium radio-active iodide $I^{131}$ solution according to U.S. Pharmacopeia containing 250 microcuries in 100 cc. is added to the drinking water for animals in the following amounts:

For beef cattle weighing between 300 kg. and 500 kg. 15 cc. to 75 cc. of radio-active sodium iodide ($I^{131}$) solution.

Of course, many changes and variations in the administration of the radioactive iodine isotope compound, and the like, in the amounts to be administered, in the type of radio-active iodine isotope compound used, in the form in which it is administered, and the like, may be made by those skilled in the art in accordance with the principles set forth herein and in the claims annexed hereto.

I claim:

1. In a method of improving meat production and meat quality as well as feed utilization by animals, the step which comprises administering to said animals an effective amount of a radio-active iodine isotope compound so as to partly inactivate the glandular thyroid tissue.

2. The method of claim 1, in which the radioactive iodine isotope compound is radio-active sodium iodide $I^{131}$.

3. The method of claim 1, in which the radio-active iodine isotope compound is administered in aqueous solution.

4. The method of claim 2, in which the active sodium iodide $I^{131}$ is administered in aqueous solution.

* * * * *